United States Patent [19]

Hikari

[11] Patent Number: 4,610,343
[45] Date of Patent: Sep. 9, 1986

[54] TRANSVERSELY ENGAGED CENTRIFUGAL CLUTCH
[75] Inventor: Kazuo Hikari, Suita, Japan
[73] Assignee: Sanyo Coupling Co., Ltd., Suita, Japan
[21] Appl. No.: 664,870
[22] Filed: Oct. 25, 1984
[30] Foreign Application Priority Data Dec. 12, 1983 [JP] Japan .................... 58-192006[U]

[51] Int. Cl.[4] ........................................... F16D 43/14
[52] U.S. Cl. ............................................. 192/105 BA
[58] Field of Search ......... 192/105 A, 105 BA, 103 B
[56] References Cited

U.S. PATENT DOCUMENTS

| | | | |
|---|---|---|---|
| 1,841,612 | 1/1932 | Leyner | 192/105 BA |
| 3,204,737 | 9/1965 | Anner | 192/105 BA |
| 3,367,464 | 2/1968 | Fullerton et al. | 192/105 BA |
| 3,675,750 | 7/1972 | Wright | 192/105 BA |
| 4,016,963 | 4/1977 | St. John | 192/105 BA |

FOREIGN PATENT DOCUMENTS

| | | | |
|---|---|---|---|
| 547762 | 6/1929 | Fed. Rep. of Germany | 192/105 BA |
| 767258 | 5/1934 | France | 192/105 BA |
| 806400 | 12/1958 | United Kingdom | 192/105 BA |

Primary Examiner—George H. Krizmanich
Attorney, Agent, or Firm—Wenderoth, Lind & Ponack

[57] ABSTRACT

A centrifugal clutch which can transmit rotation of a primary shaft on the input side to a secondary shaft on the output side joining them by utilizing a centrifugal force which increases with the increase of the rotation of the primary shaft. A shoe divided into plural segments is arranged around a rotor which is fixed to the primary shaft; arcuate dents are made on the inside of the shoe and the outside of the rotor in such a way that each of the dents on both sides is placed face-to-face in pairs and pillars can be put between their couples. The pillars are made of an elastic material and around the shoe is a spring, so that the shoe always clamped together to the rotor with the pillars being put between them. A cylinder to which the secondary shaft is fixed encloses the shoe. Thus, when the primary shaft begins to rotate accompanying the rotor, each segment of the shoe gradually comes apart from the shaft by a centrifugal force, which results in pressing them against the inside of the cylinder so strongly as to cause the secondary shaft to rotate in association with the primary shaft.

4 Claims, 4 Drawing Figures

TRANSVERSELY ENGAGED CENTRIFUGAL CLUTCH

BACKGROUND OF THE INVENTION

This invention relates to a centrifugal clutch which can transmit rotation of a primary shaft on the input side to a secondary shaft on the output side by utilizing a centrifugal force which results from the rotation of the primary shaft.

So far a centrifugal clutch has also been employed to transmit rotation from a shaft to another. However, in the conventional, common centrifugal clutch, a plurality of arms are swingably fixed to a primary shaft with pins, shoes are rotatably attached to each end of the arms, and a ring of the shoes is enclosed by a cylinder in such a way that the arms can stand upright so as to press the shoes against the inside of the cylinder to transmit rotation of the primary shaft to the secondary shaft by a centrifugal force resulting from the rotation of the primary shaft.

Accordingly, such a centrifugal clutch needs lubricating from time to time to ensure it a good operating condition because most of the joints in the machine are made of metal and connected with pins. This structure has also obliged a user to waste a lot of time in maintenance. Besides, if a user neglects to accurately align both axes of the primary and the secondary shafts on a line, the shoes cannot be brought into even contact with the inside of the cylinder.

Under these circumstances, a first object of this invention is to provide a centrifugal clutch which can be put into operation far more easily than a conventional one in which pins and arms are employed.

A second object of this invention is to provide a centrifugal clutch which needs no lubrication and operates silently. A third object of this invention is to provide a centrifugal clutch which is able to absorb a torsional vibration that follows the transmission of a driving force.

A fourth object of this invention is to provide a centrifugal clutch which permits a driving force to be transmitted effectively even if there is a little offset between the respective axes of the primary and the secondary shafts.

A fifth object of this invention is to provide a centrifugal clutch having a strong coupling force which can well withstand transmitting a large torque.

BRIEF DESCRIPTION OF THE DRAWINGS

The above objects and characteristics of this invention will be fully understood when the following description is read with reference to the attached drawings which are intended only to illustrate the invention by way of examples.

DETAILED DESCRIPTION OF THE PREFERRED EMBODIMENTS

Figure 1:
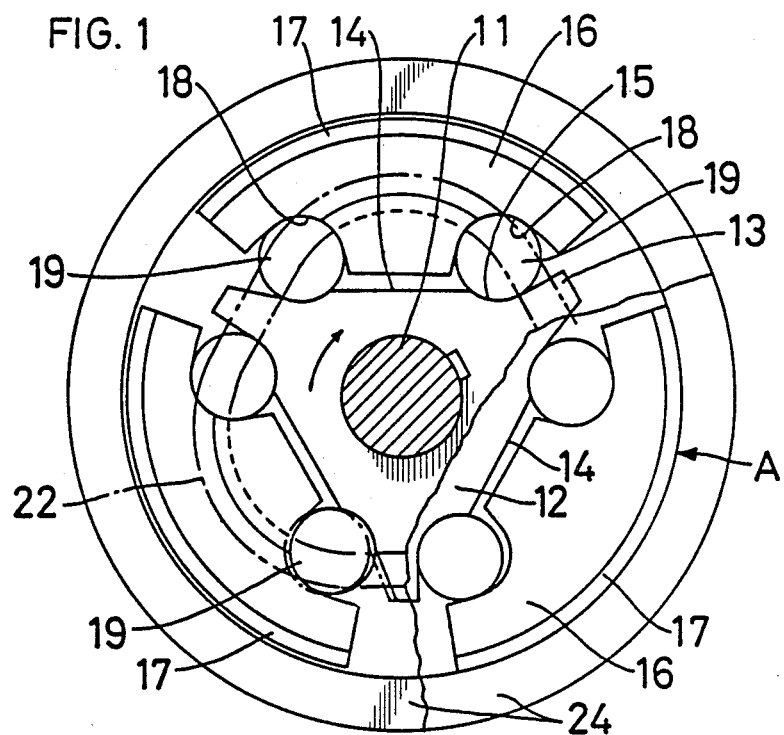
FIG. 1 is a horizontal sectional view showing a first example of a centrifugal clutch of this invention.
Figure 2:
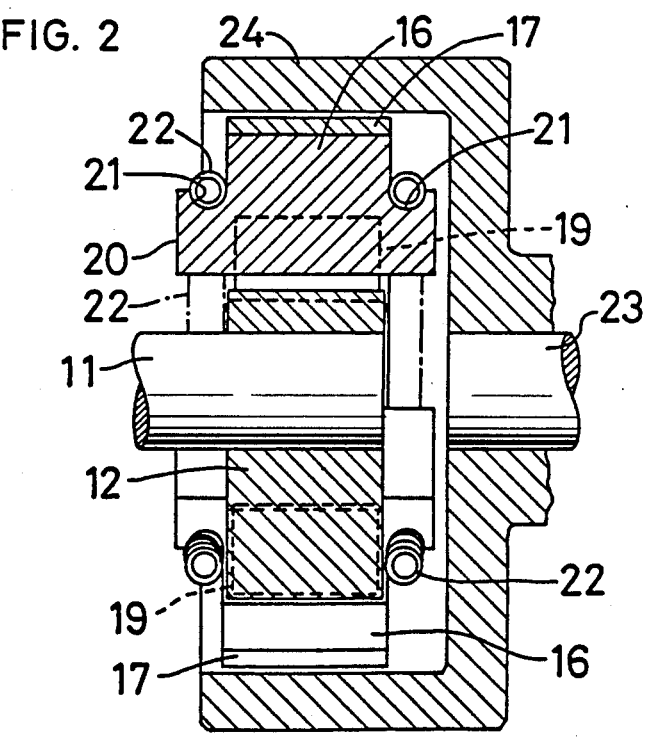
FIG. 2 is a vertical sectional view of the centrifugal clutch of FIG. 1.

Referring FIGS. 1 and 2 showing the first embodiments, a triangular rotor 12 is fixed to an end of a primary shaft 11. A receiving member 13 is provided for both sides of each apex of the triangular rotor. Near both ends of each side of the triangle is an arcuate groove 15. Outside the rotor 12 is a shoe divided into plural segments 16 whose number is made correspondent with the number of sides 14 of the rotor. (Thus, in this example, the shoe is divided into three segments each of which is faced with each side of the triangle.) The divided shoe has a lining 17 outside and arcuate grooves 18 inside, each of which is arranged vis-à-vis the grooves 15 which are near both ends of each side 14 of the rotor.

The numeral 19 designates a pillar (elongate elastomeric member) which is made of an elastic material. A pillar 19 is put in each space formed by the arcuate grooves 15 of the rotor 12 and the arcuate grooves 18 of the shoe 16; additionally, the axis of the pillars is kept standing parallel to the primary shaft 11.

There is a step 20 on upper and lower sides of the shoe 16 whose edge draws an arc parallel to the periphery of the shoe. On the riser of each step is a groove 21 in which elastic means such as a piece of coiled spring is put, by which the divided shoe is always pulled together inwardly toward the primary shaft 11. Hence, the shoe 16 is pressed against the rotor 12 by a contracting force of the coiled spring with the pillars being put between them.

A secondary shaft is designated by the numeral 23. This shaft is united to a cylinder 24 which encloses a ring of the divided shoe.

The centrifugal clutch of this invention has such structure that when the primary shaft 11 begins rotating in the direction of the arrow, as shown in FIG. 1, by means of a motor for instance, the rotor 12, the pillars 19 and a ring of the divided shoe 16 also begin rotating as one body. As the rotor 12 rotates faster, the segments of the shoe are increasingly pulled outwardly by a centrifugal force against the attraction by means of the coiled spring. In this way, the radius of the circular shoe grows as the outside lining 17 comes into contact with the inside of the cylinder 24 which still remains unmoved at the moment.

For some while, the shoe 16 continues to rotate inside the cylinder 24 rubbing it with the lining. As the rotational speed becomes much faster, a centrifugal force increases with it, which results in pressing the lining on the shoe against the inside of the cylinder so strongly as to turn it in combination with the rotor 12 overcoming a friction force exerted on the output side 23. At this moment, the pillars move as the arrow A in FIG. 1 shows.

Figure 3:
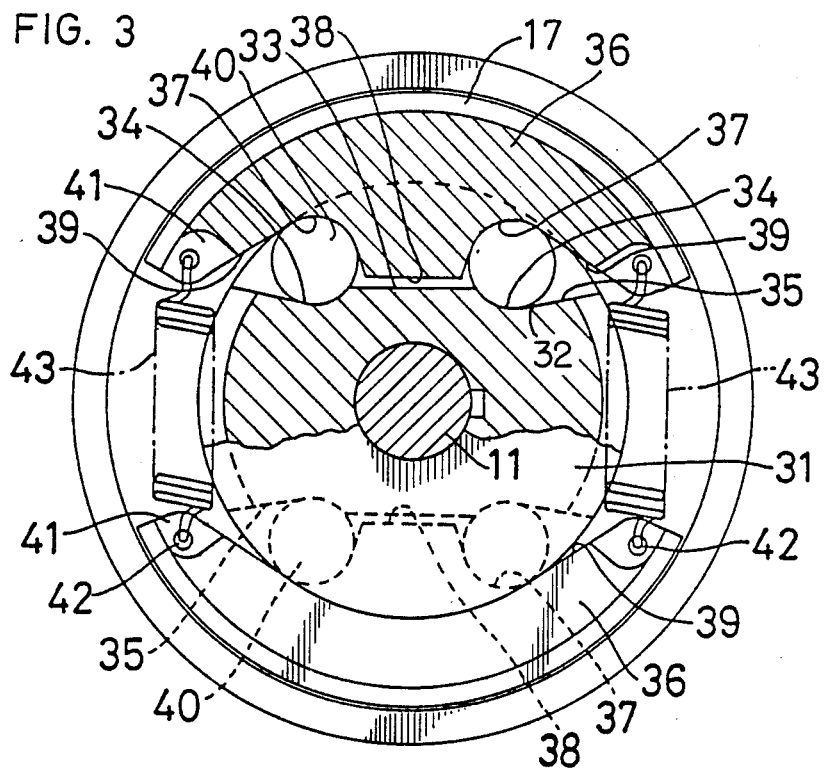
FIG. 3 is a horizontal sectional view showing a second example of a centrifugal clutch of this invention.
Figure 4:
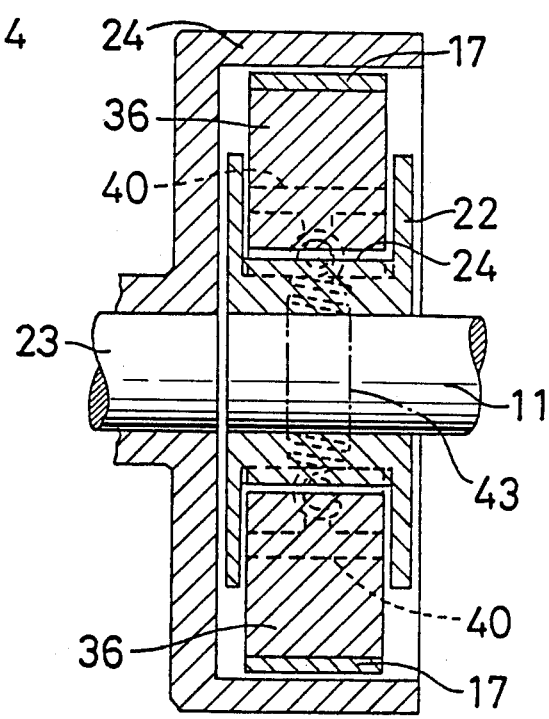
FIG. 4 is a vertical sectional view of the centrifugal clutch of FIG. 3.

Another example of this invention will now be described, which is illustrated in FIGS. 3 and 4. In this example, the description about the same part or parts having the same function as those in the above first example will be omitted by numbering them with correspondent reference numerals.

The second example of a centrifugal clutch of this invention has two grooves 32 on both sides of a rectangular rotor 31 putting a primary shaft on its center. Between the two grooves 32 on each side of the rotor is a flat portion 33; the shape of the grooves 32 is arcuate at 34 at the end of the flat portion and then turns into a slope at 35 gradually rising toward the outside. A pair of shoes 36 are arranged outside the rotor 31; they also have arcuate grooves 37 on their inside surfaces facing the rotor. Any pair of opposing grooves 32, 37 exactly face each other so as to form an oval space.

There is also a flat portion between the grooves 37 which is placed vis-à-vis the flat portion 33 of the rotor. The shoes 36 are truncated obliquely at 39 outside the grooves 37.

The numeral 40 denotes pillar made of an elastic material which are inserted between the arcuate portions 34 of the grooves 32 of the rotor 31 and the groove 37 of the shoes 36. Each shoe 36 has a coupling means 41 having a hole 42 at each truncated end. The ends of coiled springs 43 are joined to respective holes 42 which are bored through the coupling means 41. For this a pair of the coiled springs pull the pair of shoes 36 together by the two ends. Outside the periphery of the shoes is a lining 17. A primary shaft which is on the input side is designated by the numeral 11; the rotor 31 is fixed to the primary shaft. A secondary shaft which is on the output side is designated by the numeral 23. This is united to a cylinder 24 which encloses the pair of shoes.

In the second example of this invention, the shoes 36 are also pulled outwardly as a centrifugal force grows larger and get to have an inclination to the rotor 31. As a consequence, the pillars 40 come between the grooves 32 of the rotor 31 and the grooves 37 of the shoes 36. Thus, the pillars are able to unite the rotor 31 and shoes 36 so firmly as to transmit the rotational force from the primary shaft to the secondary shaft.

That is, as the rotation of the primary shaft becomes faster, a centrifugal force grows larger, which results in more strongly pressing the lining of the shoes against the inside of the cylinder 24 to such an extent that the rotor 31 and the cylinder can rotate as one body overcoming a load exerted by a friction force between the shoes and the cylinder.

As seen from the above, in the centrifugal clutch of this invention, the rotor and the shoes always hold the elastic pillars tightly because they are clamped by coiled springs; besides, when a centrifugal force grows larger, the pillars start moving toward outside wedging themselves into the space formed by the sloped and the shoes; so that there arises a wedge effect (servo effect) and this increasingly consolidates the coupling of the clutch.

For this mechanism, the capacity for transmitting a rotational force can be widely varied with a change of inclination of the slope of the surface of the rotor. A friction between the lining of the shoes and the cylinder gradually increases as the pillars more deeply interene between the sloped surface and the shoes. As a result, the contact of the shoes and the cylinder gives rise to less shock and keeps silent movement because the pillars are made of an elastic material. More than that, the pillars have an effect of absorbing a torsional vibration. Outside the above, the centrifugal clutch of this invention has an advantage over others since it can be put into operation even though there is a little offset between the primary and the secondary shafts.

What is claimed is:

1. A centrifugal clutch, comprising:
    a primary shaft having a rotor thereon, for rotation about an axis of rotation;
    a plurality of shoes surrounding said rotor in radially spaced relation thereto;
    a plurality of elastomeric members having axes extending parallel to said axis of rotation, disposed in respective pairs of opposing grooves in said rotor on said shoes, each pair of opposing grooves including a first groove surface on said rotor contacting one side of the elastomeric member and a second groove surface radially outward of said first groove surface on an opposing one of said shoes contacting another side of said elastomeric member radially outward of said one side, said first and second groove surfaces having respective surface portions extending radially and converging in a radially outward direction;
    elastic means, separate from said elastomeric members, for always clamping all of said shoes radially inward around said rotor against said elastomeric members such that a torque applied with respect to said axis of rotation so as to rotate said primary shaft and said rotor about said axis of rotation is transmitted through said elastomeric members to said shoes to rotate said shoes, said elastic means elastically resisting radially outward movement of said shoes from centrifugal forces, said elastomeric members being sufficiently movable in said pairs of grooves that said converging portions of said first and second said groove surfaces direct said elastomeric members radially outward into wedging engagement therewith in response to the centrifugal forces when said primary shaft and said rotor are rotated about said axis of rotation and said shoes are urged centrifugually outward;
    a secondary shaft; and
    a cylinder fixed to said secondary shaft so as to enclose said shoes, for engaging said shoes to be rotated therewith when said shoes are urged centrifugally outward thereagainst.

2. A centrifugal clutch as in claim 1, wherein said rotor has a triangular cross section perpendicular to said axis of rotation, the grooves in said rotor comprising six rotor grooves respectively located on opposite sides of and close to the three apexes of said triangular cross section, said shoes comprising three shoes respectively opposing the three sides of said triangular cross section.

3. A centrifugal clutch as in claim 1, wherein said rotor has two parallel sides on opposite sides and equally spaced from said axis of rotation, the grooves in said rotor including four rotor grooves respectively located on opposite ends of said two parallel sides, said shoes including two shoes respectively opposing said two parallel sides of said rotor.

4. A centrifugal clutch as in claim 1, wherein the converging portions of the groove surfaces of circumferentially alternate ones of said pairs of opposing grooves converge in radially outward and opposite circumferential directions.

* * * * *